Jan. 1, 1935. EL ROY L. PAYNE ET AL 1,986,158
VALVE
Filed Jan. 24, 1934   2 Sheets-Sheet 1
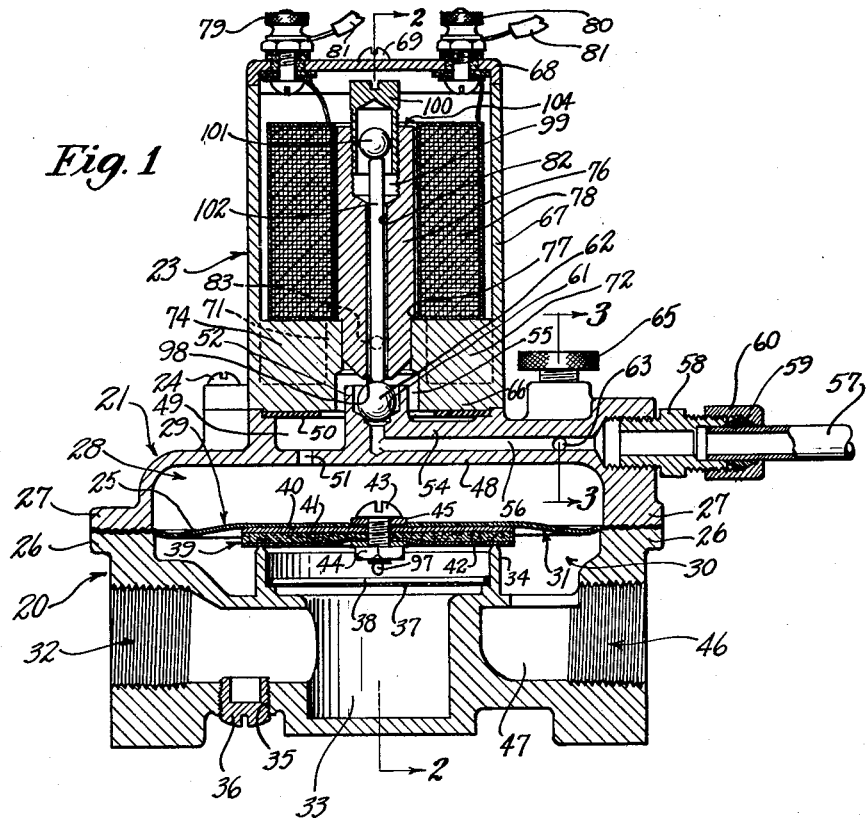
Inventors
El Roy L. Payne,
Mack George Lacy.
Attorney.

Jan. 1, 1935. EL ROY L. PAYNE ET AL 1,986,158
VALVE
Filed Jan. 24, 1934 2 Sheets-Sheet 2
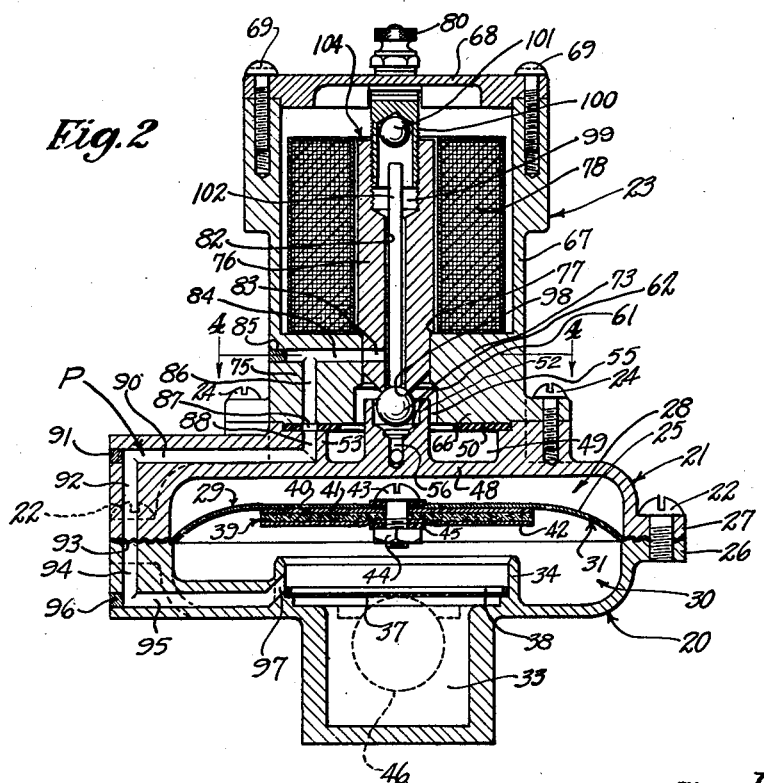
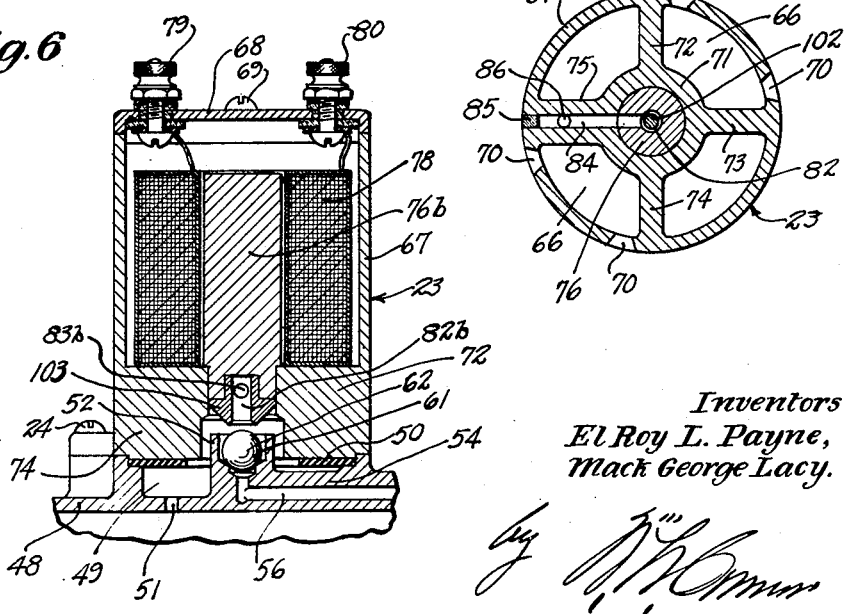
Inventors
El Roy L. Payne,
Mack George Lacy.
Attorney.

Patented Jan. 1, 1935

1,986,158

UNITED STATES PATENT OFFICE 1,986,158

VALVE

El Roy L. Payne, Beverly Hills, and Mack George Lacy, Pasadena, Calif., assignors to Payne Furnace & Supply Company, Inc., Beverly Hills, Calif., a corporation of California Application January 24, 1934, Serial No. 708,078

1 Claim. (Cl. 137—139)

Our invention relates to valves, more particularly to fluid-pressure-actuated valves, and is directed specifically to an improved diaphragm valve of the type that is designed to open and close by fluid pressure from the inlet side of the valve. Since our valve construction is particularly adaptable to remote control of a gas-burning heater, we shall describe the invention as so embodied.

A diaphragm valve of the type involved may be regarded as responding to pressure changes in what may be called its control chamber, the pressure therein being built up through an inlet passage from the inlet side of the valve and reduced through a relief passage. The valve closes when pressure in the control chamber approaches maximum and opens when that pressure is substantially reduced from maximum.

In the usual diaphragm valve only one of the two passages associated with the control chamber is controlled by an auxiliary valve, the other passage, which may be either the inlet passage or the relief passage, being open at all times. Consequently, at one position of the diaphragm valve, which may be either the open position or the closed position, both passages associated with the control chamber are open and, therefore, gas is continuously by-passed through the control chamber while the diaphragm valve is in such position.

An important object of our invention is to avoid continuous by-passing of fluid through the control chamber at any position of the valve; and to that end we provide for control, by auxiliary valves, of both of the two passages associated with the control chamber, and further provide for always closing one passage when the other passage is open, and vice versa.

The objects, features and advantages of our invention will best be understood by reference to the detailed description below, taken with the drawings, in which:

Fig. 1 is a longitudinal vertical section of the preferred form of our valve;

Fig. 2 is a similar section taken at right-angles to Fig. 1, taken as indicated by the line 2—2 of Fig. 1;

Fig. 3 is a sectional detail of a portion of the valve, taken as indicated by the line 3—3 of Fig. 1;

Fig. 4 is a horizontal section of the upper part of the valve, taken as indicated by the line 4—4 of Fig. 2;

Fig. 5 is a fragmentary vertical section of a modified form of our valve; and

Fig. 6 is a similar view showing a second modified form.

The valve body is constructed in three sections, a lower body section 20, a middle body section 21 secured thereto by a peripheral series of screws 22, and an upper body section 23 secured to the middle section by screws 24. Spanning the interior of the valve at the plane of juncture of the lower and middle body sections is a flexible circular diaphragm 25 of leather or similar material, the margin of which is retained in a fluid-tight manner between annular rim 26 of the lower body section and the complementary annular rim 27 of the middle body section. Diaphragm 25 defines, with the middle section 21 of the valve body, what may be termed a control chamber 28, and the corresponding side 29 of the diaphragm may be termed the control face of the diaphragm. Diaphragm 25 defines, with lower body section 20, a valve chamber 30, and the corresponding side 31 of the diaphragm may be termed the sealing face of the diaphragm. Valve chamber 30 forms part of the passage through the valve for the main gas stream.

Inlet port 32, screw-threaded to receive a gas supply pipe, is continuous with an inlet passage 33 which terminates at its inner end in a beveled annular flange 34 projecting upward into chamber 30 in a plane substantially parallel with the plane of juncture of valve body sections 20 and 21. Inlet port 32 is provided with a threaded opening 35, which may either be closed by a plug 36, as shown in the drawings, or used for a pilot burner outlet, if desired. The inner end of inlet passage 33, as defined by annular flange 34, is substantially smaller in cross section than the effective area of diaphragm 25.

Preferably, a circular piece of screen or strainer cloth 37 spans inlet passage 33 below the rim of flange 34, the screen being held in place by a suitable wire slip 38.

Diaphragm 25 coacts with flange 34 to open and close inlet passage 33, preferably by means of a valve member 39 carried by the diaphragm. This member may comprise an aluminum disk 40 on the under side of the diaphragm, a felt disk 41 of similar size placed against the under surface of the aluminum disk, and, at the bottom, a disk 42 of thin leather. The three disks are mounted to diaphragm 25 by means of a suitable screw 43 and nut 44 that engage washers 45 on opposite sides of the assembly.

Diaphragm 25, valve member 39 and flange 34 are so proportioned and positioned that normally, i. e., when the valve is closed, valve member 39 tends to rest upon flange 34, sealing inlet passage 33. In this position, as indicated by Fig 1, the diaphragm is of sufficient area to droop in the annular space between valve member 39 and the confined peripheral edges of the diaphragm, so that the central portion of the diaphragm has a substantial degree of vertical freedom for movement above flange 34.

Outlet port 46 of the valve, threaded to receive a pipe to the gas burner (not shown), is continuous with an outlet passage 47 that communicates with valve chamber 30.

The upper wall 48 of middle body section 21 is recessed from above to define with upper body section 23 an annular space 49 which is sealed off from the exterior of the valve by a suitable gasket 50 held in compression between the two body sections. Wall 48 is apertured at 51 to provide communication between annular space 49 and control chamber 28. Annular space 49 surrounds a central circular projection 52 integral with and extending upward from wall 48. Extending into space 49 is a shoulder 53 or thickened portion of wall 48 that presses against the under side of gasket 50. Also extending into space 49 is a radially disposed rib 54 likewise integral with wall 48. Projection 52 extends into a recess in the bottom of upper valve body section 23 to define therewith an annular space 55 that communicates with the first-named annular space 49.

Means for reducing pressure in control chamber 28 may include a relief passage 56 extending downward through projection 52 and outward radially to the exterior of the valve, the passage being enlarged and threaded at its outer end. Gas released from control chamber 28 may be carried to the furnace (not shown) by a pipe 57 connected to the valve body in any suitable manner, as by nipple 58, double beveled ring 59 and bushing 60. The inner end of passage 56 in the central projection 52 is formed to provide a valve seat 61 normally sealed by a valve member of magnetic material, such as an iron ball 62.

Relief passage 56 may be effective independent of valve member 62 by virtue of a branch passage 63 communicating with control chamber 28 (see Fig. 3). This branch passage is normally sealed by a needle valve 64 controlled by thumb screw 65 exterior of the valve.

Upper body member 23 is of cylindrical configuration, having an annular bottom 66 and a cylindrical wall 67, the top of the valve body section being provided with a suitable cover 68 attached thereto, as by means of screws 69. Preferably, wall 67 has a series of longitudinal slots 70 (Fig. 4) for the purpose of ventilation. Annular bottom 66 has an inwardly disposed flange or collar 71 reinforced by a series of radial ribs 72, 73, 74 and 75 integral with collar 71, bottom 66 and cylindrical wall 67 of the valve body. Rib 75 is thicker than the other three ribs and registers with shoulder 53 of middle body section 21.

The lower end of a soft iron core 76 of cylindrical configuration fits in a fluid-tight manner into collar 71, annular shoulder 77 of the core resting against the upper rim of the collar.

Surrounding the portion of the core 76 projecting upward within valve body section 23 is a suitably wound coil 78 which together with the core constitutes an electro-magnet. Coil 78 is electrically connected to suitable terminals of conventional design generally designated 79 and 80 in cover 68, and is energized by a circuit that includes wires 81 and a remote control switch or thermostatic switch (not shown).

An inlet passage or by-pass, generally designated P, for the purpose of building up pressure in control chamber 28 by introducing gas from the inlet side of the valve, may be provided as follows: A longitudinal bore 82 in core 76 communicates with a radial bore 83 in the core, which radial bore registers with a similar radial bore 84 extending through rib 75. The outer end of bore 84 is sealed by plug 85. Bore 84 communicates with a longitudinal bore 86 in rib 75 that extends through bottom 66 and registers with both a suitable aperture 87 in washer 50 and a longitudinal bore 88 in shoulder 53 of middle body section 21. The inlet passage is continued by radial bore 90 sealed at its outer end by a suitable plug 91, and by a longitudinal bore 92 that registers both with an aperture 93 in diaphragm 25 and a longitudinal bore 94 in lower body section 20. The inlet passage is continued by a radial bore 95 sealed at its outer end by plug 96, the inner end of bore 95 terminating in an inclined bore 97 through flange 34 surrounding inlet passage 33.

The lower end of longitudinal bore 82 in electro-magnet core 76 is modified to form a second and upper valve seat 98 for ball 62, and the solenoid is designed to attract the ball from its normal position in the lower valve seat into sealing engagement with this upper valve seat.

The arrangement of passages shown herein in combination with a valve member that alternately closes the passages may be considered as the equivalent of a three-way valve. Thus, when valve member 62 is in its normal position engaging lower valve seat 61, communication is established between control chamber 28 and inlet passage 33 as follows: Port 51, annular space 49, annular space 55 and the inlet passage P comprising the series of bores above described. When ball 62 is attracted to the upper valve seat, gas is released from the control chamber through port 51, annular space 49, annular space 55 and relief passage 56.

Regarded from another aspect, our arrangement for varying the pressure in control chamber 28 may be said to comprise two connected or interlocked valves. Thus, the upper side of ball 62 may be considered as a valve member controlling inlet passage P, and the bottom portion of the ball may be considered as a valve member controlling relief passage 56, while the intermediate portion of the ball may be considered as means connecting the two valve portions.

The operation of the diaphragm valve may now be described. Normally, valve member 39 rests against annular flange 34 by virtue of an unbalanced pressure against the diaphragm. Relative high pressure from inlet passage 33 is conveyed to control chamber 28 through inlet passage P and exerted against the upper or control face 29 of the diaphragm. Ball 62, resting in lower valve seat 61, prevents the release of pressure built up in the control chamber. Since outlet port 46 leads to a burner (not shown) atmospheric pressure only is exerted against the under side of the diaphragm on the outside of annular flange 34. In this normal situation, it is apparent that the total pressure downward on diaphragm 25 exceeds the total pressure upward on the diaphragm.

When ball 62 is moved upward by the electro-magnet to its alternate position in valve seat 98, thereby sealing off inlet passage P, relief passage 56 is simultaneously opened to permit the release of gas pressure from control chamber 28 and pressure thereupon quickly drops to such an extent that the total pressure on control face 29 of the diaphragm is less than the total pressure on sealing face 31 of the diaphragm. Closure member 39 is, therefore, moved vertically to spaced relation with flange 34 to permit fluid from inlet passage 33 to flow over flange 34 through chamber 30 and outlet passage 47, as shown in Fig. 2. An important object of our invention is thus attained by sealing off the inlet passage during the time that the main valve is open. In other words, we obviate the necessity of continuously by-passing gas to the furnace through pipe 57 while the main valve is open.

When, the valve being open as shown in Fig. 2, the electro-magnet is de-energized, permitting ball 62 to drop into lower valve seat 61, relief passage 56 is thereby closed and inlet passage P opened, so that pressure is quickly built up in control chamber 28, causing the diaphragm valve to take the closed position shown in Fig. 1.

In case of current failure, the valve may be operated by manipulating thumb screw 65. When needle valve 64 is closed pressure from inlet P will close the diaphragm valve. When needle valve 64 is open to provide for continuous by-passing of fluid from the inlet side of the main valve, through control chamber 28 to the furnace, the diaphragm valve will open.

After a valve of the construction described has been operated a number of times, ball 62 may be held in the upper valve seat 98 after the solenoid is de-energized, the ball being held against the action of gravity and fluid pressure from inlet passage P, by residual magnetism either in the ball or in core 76, or in both. We prefer, therefore, to incorporate in the valve construction means to jar ball 62 free from the core immediately after the electro-magnet is de-energized. One form of such a means will now be described.

Bore 82, extending axially upward through core 76, terminates in a recess 99 or hollowed upper end of the core. The recess is threaded to receive a liner of non-magnetic material, as, for instance, a hollow brass plug 100, that, in addition to other functions, serves to seal off the interior of the core. It will be noted that the cylindrical wall of the brass plug extends above the upper end 104 of core 76.

When a small weight of magnetic material, such as small iron ball 101, is loosely encased in such a non-magnetic liner extending into an electro-magnetic core, as shown, energization of the electro-magnet will cause the weight or ball to seek the outer end of the core, and, if restrained by the walls of the liner extending beyond the ends of the core, the weight or ball will be attracted from the position indicated in Fig. 1 to substantially the position indicated in Fig. 2.

Normally, ball 101 rests upon the upper end of a pin 102 of aluminum, or other non-magnetic material, which is loosely contained in bore 82 and rests at all times on lower ball 62. When the action of the electro-magnet attracts ball 62 upward from lower valve seat 61 to upper valve seat 98, pin 102 is thereby shifted axially from the position shown in Fig. 1 to that shown in Fig. 2, and the magnetic field of the energized electro-magnet lifts ball 101 above the upper end of the pin and holds it in suspension continuously while the diaphragm valve is open. Immediately upon the de-energization of the electro-magnet, ball 101 drops against the upper end of pin 102, which pin transmits the force of impact to lower ball 62, the force of impact being sufficient to overcome the effect of any residual magnetism. It is believed that successive blows from pin 102 are delivered along different radii of ball 62 and tend, therefore, to discourage any uniform magnetic alignment of the atoms within the ball.

In this construction the proportioning of elements is of importance. The range of vertical movement of ball 101 may be less than a quarter of an inch for a given design of an electro-magnet. Pin 102 must be long enough, therefore, to lift ball 101 into the effective range of the magnetic forces that tend to lift the ball into suspension, but if the pin is made too long the gap between the pin and the suspended ball when the electro-magnet is energized may be reduced to such an extent that the force of impact of the released ball will be ineffective.

The problem of residual magnetism may be approached by using material such as laminated iron for either the ball or the core, or both. By using such a material having a minimum tendency to exert residual magnetism, the necessity for any jarring means may be avoided and the construction of the electro-magnet may take the simplified form indicated by Fig. 5, in which corresponding numbers indicate corresponding parts of the other figures. It will be noted that in Fig. 5 bore 82a extends upward into core 76a only a sufficient distance to communicate with radial bore 83a, forming a part of the inlet passage P.

The problem of overcoming residual magnetism may also be approached by providing a non-magnetic spacer between the core of the electro-magnet and the valve ball. In Fig. 6, where again corresponding numbers indicate corresponding parts of the other figures, such a construction is indicated. Core 76b has the same general configuration as core 76a of Fig. 5, but is provided at its lower end with a brass bushing 103 that defines bore 82b and serves as a valve seat for ball 62. Because of such a spacing means, ball 62 will readily drop away from the upper valve seat when the electro-magnet is de-energized.

The specific forms of our invention which we have described in detail for the purposes of complete disclosure and to illustrate the principles involved, suggest a wide range of structural modifications. We reserve the right to all such changes and modifications that properly come within the scope of our appended claim.

Having described our invention, we claim:

In a device of the class described, the combination of: a core of magnetic material having a longitudinal bore therethrough, one end of the bore constituting a valve seat, the core being recessed at the opposite end of said bore; a coil associated with said core to constitute therewith an electro-magnet; a valve member of magnetic material normally spaced from said valve seat in a position to be attracted to the seat when the electro-magnet is energized; a weight of magnetic material normally within said recess of the core; a hollow member of non-magnetic material lining said recess and confining said weight, whereby when the electro-magnet is energized the weight is attracted away from the inner end of the recess; and a member of non-magnetic material within the bore extending from said recess to said valve seat whereby upon de-energization of the electro-magnet the force of impact of the released weight delivered through said non-magnetic member will jar the valve member free of the valve seat against the force of residual magnetism.

EL ROY L. PAYNE.
MACK GEORGE LACY.